UNITED STATES PATENT OFFICE.

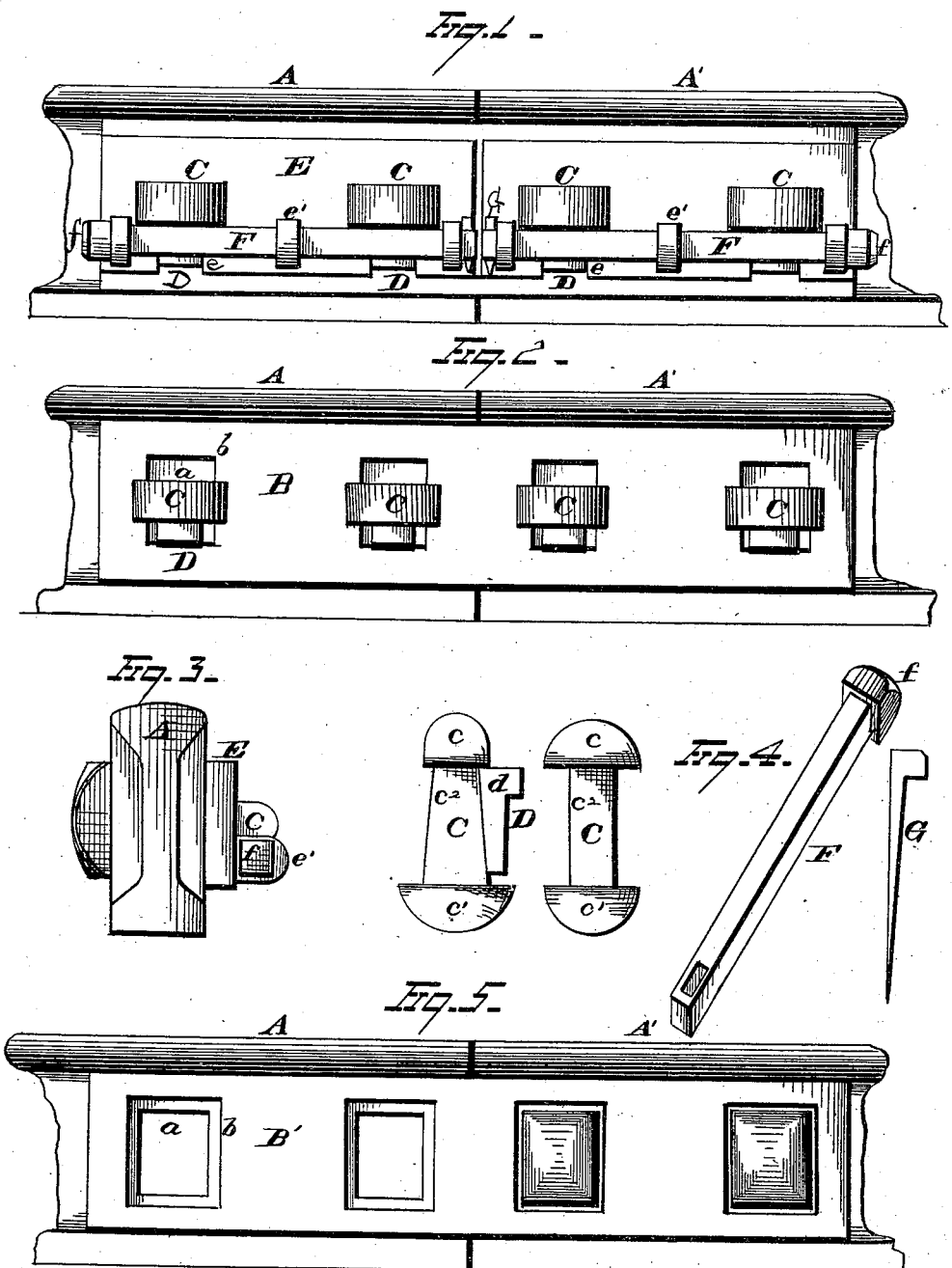

JAMES J. WALDEN, OF LOCUST SUMMIT, PENNSYLVANIA.

IMPROVEMENT IN NUT-LOCKS.

Specification forming part of Letters Patent No. 193,789, dated July 31, 1877; application filed January 31, 1877.

*To all whom it may concern:*

Be it known that I, JAMES J. WALDEN, of Locust Summit, in the county of Northumberland and State of Pennsylvania, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut locks or fastenings for railway-joints, the object of the same being to provide a fastening for railway-joints wherein screw-threaded bolts and nuts are dispensed with, and double-headed bolts substituted in lieu of the ordinary bolts, to preclude the accidental displacement of any of the parts of the fastening device, and thus insure a durable and reliable nut-lock.

In the accompanying drawings, Figure 1 is a side elevation of my invention. Fig. 2 is a side elevation, with the locking-plate removed. Fig. 3 shows an end view of the rail and fastening devices. Fig. 4 represents detached views of the several parts of the device. Fig. 5 represents a rear elevation of the rail and fastening device.

A A' designate the ends of ordinary railway-rails, each of which has oblong openings $a$ formed therein. B B' represent the front and rear fish-plates, each of which has oblong openings $b$, corresponding in size and shape with the openings $a$ in the rails.

The rear fish-plate B', if desired, may be countersunk about its openings $b$, to furnish a side support for the head of the bolt, and prevent the same from turning; but this exact construction is not absolutely essential, as other provision is made to prevent any movement of the bolt when secured in position.

C designates the bolts, any desired number of which may be employed. Said bolts are constructed with oblong heads $c$ $c^1$, arranged at right angles to each other, and made solid with the shank of the bolt. The shank $c^2$ of the bolt is formed of uniform thickness throughout its length, while it gradually decreases in width from the rear to the front head to constitute a wedge, for a purpose hereinafter specified.

The letter D represents a wedge, which is formed of substantially the same width as the shank of the bolt. The head $d$ of the wedge is made of such size and thickness that it will fit snugly between the fish-plate and the inner surface of the bolt-head, and thus serve to prevent longitudinal displacement of the bolts C, while it also serves as a bearing for the bolt.

Should an engine or car jump the track and strike the head of the bolt C, the wedge would insure the reliability of the fastening, as it constitutes a firm bearing for all that part of the shank of the bolt that projects outwardly beyond the fish-plate.

The bolts are inserted as follows: The front head of the bolt is turned until it registers with the oblong opening in the fish-plate, when it is forced through the fish-plates and rail, and the bolt is then given a quarter turn to arrange the head at right angles to the length of the opening in the fish-plate. The wedge D is then driven beneath the bolt until its head passes in rear of the bolt-head; and after the several bolts and wedges of a single complete railway-joint have been thus secured the locking-plate is secured as follows: E is a locking-plate, and the same is formed with two or more oblong open slots, $e$, the slots being of sufficient width to snugly fit the shanks of the several bolts of the fastening. This locking-plate is placed over the bolts, and then forced downwardly until the upper portion of the slotted plate rests upon the shanks of the bolts.

In order to firmly secure the wedges against loss or displacement, the plate E is provided with two or more staples, $e^1$, which latter are secured to the lower portion of the plate, or formed solid therewith, so that the several staples shall be in line, or nearly in line, with the wedges when in position. A locking-bar, F, having a head, $f$, at one end, is then inserted through the several staples $e$, and secured by a linchpin or in any desired manner. As the locking-bar rests in close contact with the heads of the wedges, the latter are securely held in place by the same.

Should the several parts of the fastening or lock become loosened, owing to changes of temperature, or to wear, or to imperfect construction, the several parts may be rendered perfectly tight and secure by driving a long thin wedge, G, between the locking-plate E and the fish-plate. I do not consider that this wedge is an essential part of my invention; but its use may be necessary under certain conditions, as above set forth.

It is apparent that a fastening for railway-joints constructed in accordance with my invention possesses one decided advantage over a large class of similar fastenings, from the fact that screw-threaded bolts and nuts are entirely dispensed with, and hence all the objections flowing from their employment are obviated. Some of the objections referred to are, the screw-threads are often cut away by the severe strain caused by sudden changes in temperature. Again, the threads become impaired, and render it a difficult matter to either remove or replace the nuts, and again, complicated devices must be resorted to in order to prevent the displacement of the nuts from the screw-threaded bolts.

In the fastening device above described the lateral strain on the fish-plates, caused by the heavy weight of passing trains, is amply provided for by the strong solid double-headed bolts, and as these bolts may be of large size and of the most durable metal, all danger arising from the separation or spreading of the rails at their joints is effectually obviated.

Having fully described my invention, what I claim as new, and desire to secure by Letters Patent, is—

1. A solid double-headed bolt, the heads of which are arranged at right angles to each other, said bolt having a wedge-shaped shank, substantially as and for the purpose set forth.

2. The combination, with the rails and fish-plates provided with oblong openings, of double-headed bolts, a locking-plate, and wedges driven beneath the shank of said bolts, the heads of said wedges secured beneath the heads of the bolts, substantially as and for the purpose set forth.

3. The combination, with the double-headed bolts and wedges driven in contact with the same, of a locking-plate provided with staples and a locking-bar, to prevent the displacement of said wedges, substantially as and for the purpose set forth.

In testimony that I claim the foregoing I have hereunto set my hand this 31st day of January, 1877.

JAMES J. WALDEN.

Witnesses:
F. O. McCLEARY,
ED. I. NOTTINGHAM.